United States Patent [19]

Shakshober et al.

[11] 4,058,227
[45] Nov. 15, 1977

[54] PNEUMATIC CONVEYING OF GRANULAR MATERIALS FROM A NONPRESSURIZED ENVIRONMENT

[75] Inventors: MacLean C. Shakshober, Chadds Ford; Eugene Schorsch, Springfield; Paul E. Atkinson, West Chester, all of Pa.

[73] Assignee: Sun Shipbuilding & Dry Dock Company, Chester, Pa.

[21] Appl. No.: 731,274

[22] Filed: Oct. 12, 1976

[51] Int. Cl.² .......................................... B65G 53/04
[52] U.S. Cl. ...................................... 214/13; 302/49; 302/57
[58] Field of Search ............... 302/49, 51, 57; 214/12, 214/13, 14, 15 R, 15 B

[56] References Cited

U.S. PATENT DOCUMENTS

| 491,959 | 2/1893 | Clarke | 302/57 X |
|---|---|---|---|
| 714,499 | 11/1902 | Matton | 214/13 |
| 3,233,463 | 2/1966 | Kaufmann | 302/58 X |
| 3,574,411 | 4/1971 | Miller | 302/49 |
| 3,863,808 | 2/1975 | Vertue | 302/51 X |

FOREIGN PATENT DOCUMENTS 1,412,693  11/1975  United Kingdom .................. 302/51

Primary Examiner—Frank E. Werner
Attorney, Agent, or Firm—J. Edward Hess; Donald R. Johnson; Paul Lipsitz

[57] ABSTRACT

A pneumatic system for removing granular material, such as wheat, from a nonpressurized vessel such as a barge. Gas from a blower system is supplied to a plenum chamber mounted on top of two concentric pipes which extend down into the vessel. The gas flows down the outer pipe and is discharged into the granular material, thereby entraining it. The air and entrained material mixture then flow up the inner concentric pipe and out of the vessel. A rotary valve mounted on a chamber at the bottom of the concentric pipes allows granular material to flow into the chamber, but isolates the high pressure in the chamber from surrounding granular material.

1 Claim, 1 Drawing Figure

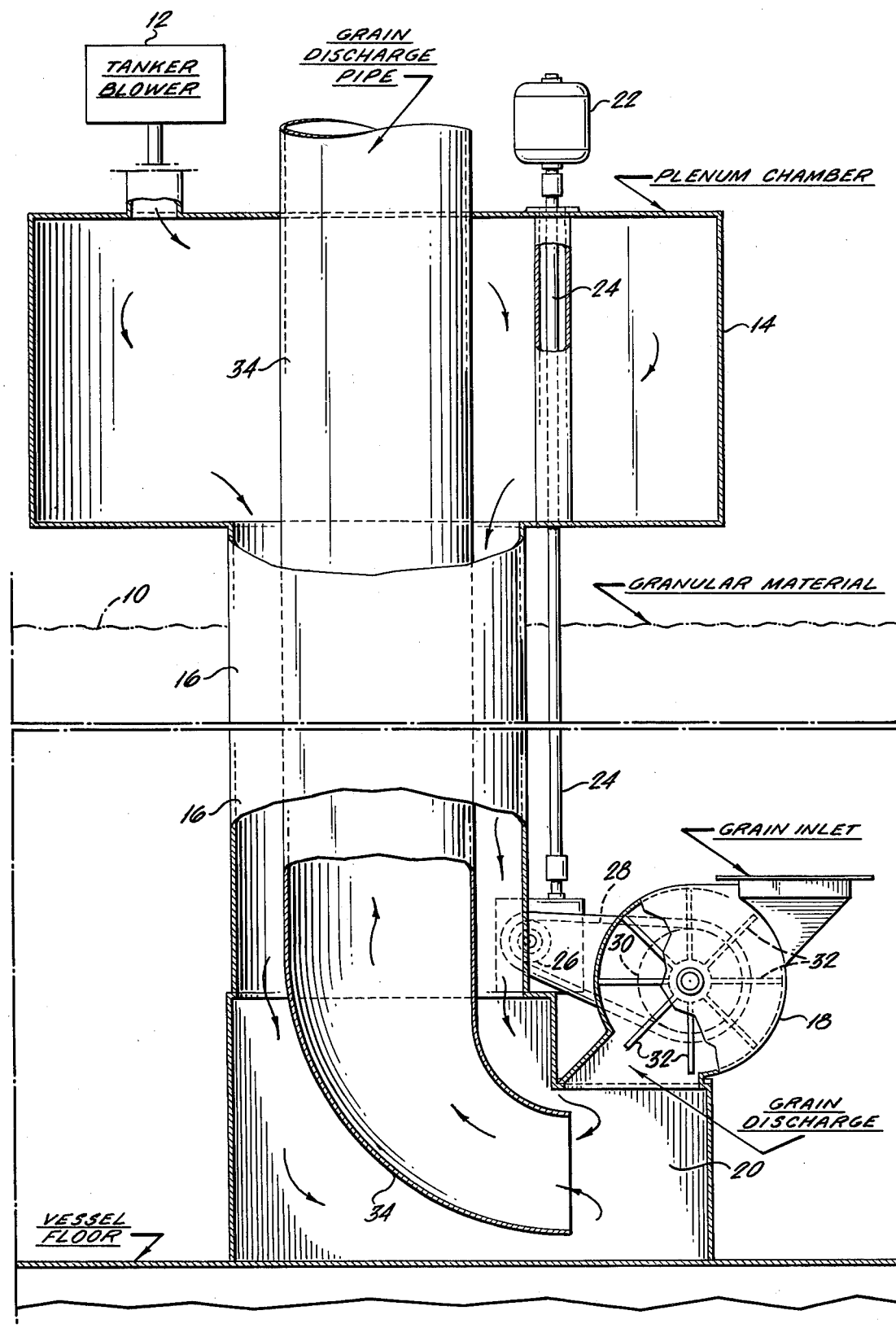

PNEUMATIC CONVEYING OF GRANULAR MATERIALS FROM A NONPRESSURIZED ENVIRONMENT

BACKGROUND OF THE INVENTION

The present invention relates generally to a pneumatic system for unloading granular material from a nonpressurized container, and more particularly pertains to a pneumatic system for unloading grain from an open vessel such as a barge.

There presently exists a substantial demand for the shipment of granular material, such as wheat, to various parts of the world. At the same time, present political and economic situations around the world have resulted in a surplusage of oil tankers. In view of the surplusage of oil tankers and the demand for shipment of wheat, it would be desirable to be able to transport wheat in vessels designed for the carriage of oil.

Loading and unloading of granular materials should be handled as quickly and efficiently as possible. One method used in the prior art to unload granular material such as wheat has utilized VACUVATOR equipment, which is in the nature of a giant vacuum cleaner. This equipment is brought on board the vessel being unloaded, and wheat is simply vacuumed out of the vessel holds during unloading. One problem with this approach is that it is very time consuming.

Often, wheat transporting ships are too large to dock in port, and accordingly these large ships must be loaded and unloaded in deeper water away from the docks. In this situation the cargo may be loaded onto smaller vessels, such as barges, for transportation between the dock and larger ship. Some of these large ships, such as oil tankers, have large blower systems on board which are utilized for various functions. It would be desirable to have a system for unloading granular material from a vessel, such as a barge, which operates rapidly and effeciently, and which could take advantage of an existing blower system.

SUMMARY OF THE INVENTION

In accordance with a preferred embodiment, a system is disclosed for removing granular material from a nonpressurized container. In the preferred embodiment, a discharge pipe for transporting granular material out of the container has a discharge end outside the container and a pickup section in the container. A pressurized gas pipe, coupled to a source of pressurized gas, transports pressurized gas to the pickup section of the discharge pipe where it flows into and entrains the granular material. The granular material is then transported from the container through the discharge pipe. Further, in the preferred embodiment, the discharge pipe and the pressurized gas pipe are concentric pipes, with the discharge pipe being the inner pipe. Further, the preferred embodiment has particular utility wherein the nonpressurized container is a nonpressurized hold of a ship, and wherein the system is utilized to remove granular material from the hold onto a second ship already having a source of pressurized gas existing thereon. Also, in the preferred embodiment a plenum chamber is utilized to couple the source of pressurized gas to the pressurized gas pipe. Further, the preferred embodiment includes a valve mounted at the pickup section of the discharge pipe for allowing grain to flow toward the pickup section while isolating the pressurized gas from surrounding granular material.

BRIEF DESCRIPTION OF THE DRAWING

The drawing illustrates a side view of one embodiment of the present invention.

Detailed Description of that Embodiment

Referring to the drawing, there is illustrated a system for removing a granular material, such as wheat, from a nonpressurized container, such as an open barge. The granular material is illustrated as being present to a level 10 which covers the lower portion of the removal system. Pressurized gas is supplied to the system by a blower system 12. In some embodiments where an oil tanker already having a blower system is involved in the loading/unloading operation, the already existing blower system may be advantageously utilized for blower 12. Gas from the blower system is supplied to a plenum chamber 14 which is open to a pipe 16 which extends down, into the granular material being removed, to near the bottom of the container. The grain flows through a rotary isolation valve 18, the function of which is to allow grain to enter chamber 20 while isolating surrounding grain from the pressurized gas in chamber 20. The rotary isolation valve may be one of several different types which are commercially available today, such as are available from Sprout, Waldron & Company, Inc., Muncy, PA 17756 and Young Corporation. The valve is driven by a drive motor 22, mounted on top of plenum chamber 14, which drives a shaft 24, which in turn drives an enclosed sprocket 26. Sprocket 26 drives an enclosed chain 28, which drives a further sprocket 30, which in turn drives a rotor having a plurality of vanes 32. As the rotor rotates, grain fills each void between adjacent vanes, and is rotated through the valve to its bottom where it is discharged into chamber 20. The vanes serve to isolate the pressurized chamber 20 from the surrounding grain so that it is not simply blown away. The grain entering chamber 20 is entrained by the gas pumped down pipe 16, and the gas and entrained material mixture flow into the end of a discharge pipe 34, which is positioned inside, and concentric with, the pressurized gas pipe 16. The entrained grain is then pumped up discharge pipe 34, and is unloaded into some suitable container. For instance where an oil tanker is being loaded with grain from a barge, the discharge pipe 34 may extend into the hold of the adjacent tanker, and the blower system from the oil tanker may be utilized as blower 12.

In operation the grain would be removed until it were depleted down to a level at which additional grain would not flow toward valve 18. At this time, removal would have to be accomplished in some other manner. For instance, workers might shovel the remaining grain into the valve 18, or vacuum equipment might be utilized, or the grain might simply be shoveled into containers for removal.

In some embodiments, pipes 16 and 34 might have a configuration other than concentric. Also, although the term granular material has been used herein, it should be understood that this term has been selected as a generic term for all types of material (such as powders) to which the teachings of the present invention may be applicable. Also, the illustrated embodiment has been explained with reference to a tanker and a barge. However, the teachings of the present invention are also applicable to the removal of granular materials from other types of containers such as trains, trucks, bins, warehouses, etc. Although at least one embodiment of the present invention has been described, the teachings of this invention will suggest many other embodiments to those skilled in the art.

The invention claimed is:

1. A system for removing granular material such as a food grain from an open container such as a barge to the hold of a ship which comprises:
   a. a plenum chamber having input means for a source of pressurized gas and coupled to a first pipe extending into said granular material;
   b. a second discharge pipe inside and concentric with said first pipe extending from the bottom of said first pipe through said plenum chamber to provide for discharge of said granular material to the outside of said plenum chamber;
   c. valve means at the bottom of said first pipe to control the flow of granular material to said second concentric pipe;

whereby, when a pressurized gas from the ship to receive the granular material is introduced into said plenum chamber, said gas flows downwardly through said first pipe and pushes any granular material admitted by said valve upwardly through said second discharge pipe from which it may be conveyed to the hold of the ship receiving the granular material.

* * * * *